United States Patent
Thalen

(10) Patent No.: US 9,683,193 B1
(45) Date of Patent: Jun. 20, 2017

(54) COLOR-STABLE TRANSMISSION FLUID COMPOSITIONS

(71) Applicant: Afton Chemical Corporation, Richmond, VA (US)

(72) Inventor: Lisa K. Thalen, Fredericksburg, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 15/077,554

(22) Filed: Mar. 22, 2016

(51) Int. Cl.
C10M 135/36 (2006.01)
C10N 30/06 (2006.01)
C10N 30/20 (2006.01)
C10N 40/04 (2006.01)

(52) U.S. Cl.
CPC .... *C10M 135/36* (2013.01); *C10M 2219/106* (2013.01); *C10N 2030/06* (2013.01); *C10N 2030/20* (2013.01); *C10N 2040/04* (2013.01); *C10N 2230/06* (2013.01); *C10N 2230/20* (2013.01); *C10N 2240/04* (2013.01)

(58) Field of Classification Search
CPC ............................................... C10M 2219/106
USPC ......................................................... 508/272
See application file for complete search history.

(56) References Cited

U.S. PATENT DOCUMENTS

| | | | |
|---|---|---|---|
| 2,719,125 A | 9/1955 | Roberts | |
| 2,719,126 A | 9/1955 | Fields et al. | |
| 2,749,311 A | 6/1956 | Sabot et al. | |
| 2,764,547 A | 9/1956 | Fields | |
| 3,087,932 A | 4/1963 | Little, Jr. | |
| 4,029,588 A | 6/1977 | Koch | |
| 4,661,273 A * | 4/1987 | Frangatos | C07D 285/125 508/231 |
| 4,943,672 A | 7/1990 | Hammer et al. | |
| 5,344,579 A | 9/1994 | Ohtani et al. | |
| 5,882,505 A | 3/1999 | Wittenbrink et al. | |
| 6,013,171 A | 1/2000 | Cook et al. | |
| 6,080,301 A | 6/2000 | Berlowitz et al. | |
| 6,096,940 A | 8/2000 | Wittenbrink et al. | |
| 6,103,099 A | 8/2000 | Wittenbrink et al. | |
| 6,165,949 A | 12/2000 | Berlowitz et al. | |
| 6,180,575 B1 | 1/2001 | Nipe | |
| 6,548,458 B2 | 4/2003 | Loper | |
| 8,410,032 B1 | 4/2013 | Carroll et al. | |
| 8,536,103 B2 | 9/2013 | Denis et al. | |
| 8,703,669 B2 | 4/2014 | Iyer | |
| 2005/0202979 A1 | 9/2005 | Henly | |
| 2006/0025314 A1 | 2/2006 | Henly | |

FOREIGN PATENT DOCUMENTS

EP 2706105 A1 3/2014

OTHER PUBLICATIONS

Saha, Ajoy, et al. "Green synthesis of 5-substituted-1, 3, 4-thiadiazole-2-thiols as new potent nitrification inhibitors." Journal of Heterocyclic Chemistry 47.4 (2010): 838-845.
Hipler, F., et al. "N-H . . . S Hydrogen Bonding in 2-Mercapto-5-Methyl-1,3,4-Thiadiazole. Synthesis and Crystal Structures of Mercapto Functionalised 1,3,4-Thiadiazoles," Journal of Molecular Structure, 2003, vol. 658, pp. 179-191.

* cited by examiner

*Primary Examiner* — Vishal Vasisth
(74) *Attorney, Agent, or Firm* — Mendelsohn Dunleavy, P.C.

(57) ABSTRACT

The present disclosure describes transmission fluid compositions, additive packages, and methods for lubricating a transmission, particularly transmission fluid compositions having color stability that are able to meet or exceed vehicle transmission fluid specifications for different makes of vehicles. The transmission fluid composition contains a base oil and an additive composition having at least one thiadiazole compound the selected from compounds of the Formulas (I)-(II):

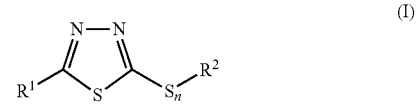

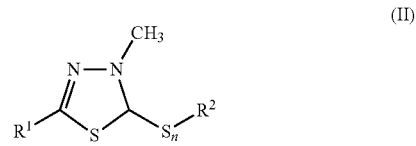

wherein n is 1-5; $R^1$ is a substituted or unsubstituted hydrocarbyl group having 1-100 carbon atoms; and $R^2$ is a hydrogen or is a substituted or unsubstituted hydrocarbyl group having 1-100 carbon atoms, wherein the transmission fluid composition is adapted for use in a transmission.

22 Claims, No Drawings

COLOR-STABLE TRANSMISSION FLUID COMPOSITIONS

TECHNICAL FIELD OF THE INVENTION

The present disclosure relates to transmission fluids, additive packages, and methods for lubricating a transmission, particularly transmission fluids including thiadiazoles that exhibit color stability and are able to meet or exceed vehicle transmission fluid specifications for different makes of vehicles.

BACKGROUND OF THE INVENTION

A transmission system for a vehicle is suitably configured to deliver improved power transmitting efficiency, and improved fuel efficiency. Transmission mechanisms may include a manual transmission, a conventional stepped automatic transmission, a continuously variable transmission, a double clutch transmission, or another type of vehicle transmission. Such transmissions are typically used with conventional gasoline or diesel engine systems.

The transmission of power between engine components will, over time, result in wear of the components. In order to reduce this wear, certain sulfur-containing extreme pressure/antiwear additive components have been used in transmission fluids. For instance, U.S. Pat. No. 8,410,032 and US 2006/0025314 disclose transmission fluids containing substituted or unsubstituted compounds having a 2,5-dimercapto-1,3,4-thiadiazole core (hereinafter "DMTD" compounds") as an extreme pressure/antiwear additive component.

U.S. Pat. Nos. 2,719,125 and 2,719,126 describe the preparation of various DMTD compounds. In these compounds, each hydrocarbyl group may be linked to the thiadiazole through multiple sulfur atoms. The hydrocarbon group may be aliphatic or aromatic, and may include cyclic and alicyclic hydrocarbyl groups, as well as aralkyl, aryl and alkaryl groups. The foregoing polysulfides may be represented by the following general formula:

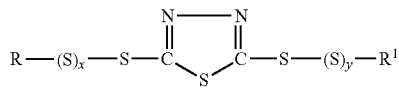

wherein R and $R^1$ may be the same or different hydrocarbon groups, and x and y may be integers from 0 to 8, and the sum of x and y is at least 1. A process for preparing such compounds is described in U.S. Pat. Nos. 2,719,125; 3,087,932; and 2,749,311. The reactions referenced and described in the foregoing documents may produce some amount of the by-product 2-hydrocarbyldithio-5-thiol-thiadiazole (not encompassed by the above-formula) as well as the 2,5-bis(hydrocarbyldithio)-thiadiazole compound both of which are DMTD compounds. The ratio of the two may be adjusted by varying the amounts of the reactants. However, a problem has been observed in that transmission fluids containing these DMTD compounds may prematurely darken, even though the wear characteristics may not yet have diminished in the transmission fluid. The typical user who notices the darkened fluid assumes that the transmission fluid is no longer functioning properly, and may prematurely replace the darkened transmission fluid.

An object of the present invention is to overcome this discoloration problem by including one or more thiadiazole compounds in a transmission fluid composition which will provide sufficient antiwear properties at extreme pressures while also having the advantage of color stability.

SUMMARY OF THE INVENTION

In a first aspect, the present invention relates to a transmission fluid composition including 50% to 99% by weight of a base oil, based on the total weight of the transmission fluid composition and an additive composition comprising one of (a) a reaction product of thiadiazole of one of the formulae (III) and (IV):

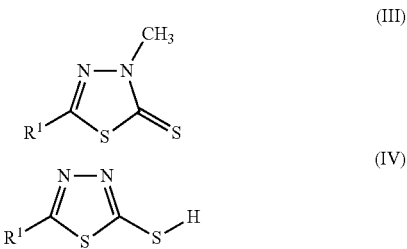

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source; and (b) at least one compound of the Formulas (I)-(II):

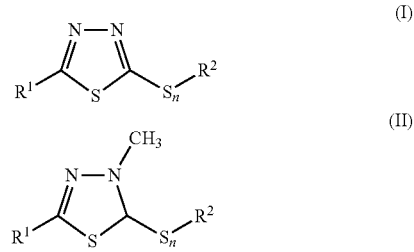

wherein n is 1-5; $R^1$ is a substituted or unsubstituted hydrocarbyl group having 1-100 carbon atoms; and $R^2$ is hydrogen or a substituted or unsubstituted hydrocarbyl group having 1-100 carbon atoms. The transmission fluid composition is adapted for use in a transmission by, for example, being formulated to meet one or more industry specifications for transmission fluids.

In certain embodiments, the transmission fluid composition includes at least one compound of the Formula (I), the transmission fluid composition includes at least one compound of the Formula (II) or the transmission fluid composition includes at least one compound of the Formula (I) and at least one compound of the Formula (II). In some embodiments, $R^1$ is an alkyl group having 1-10 carbon atoms, and n is 2, or n is 2 and $R^2$ is a hydrocarbyl group having 8-12 carbon atoms, or n is 2 and $R^2$ is a hydrocarbyl group having 8-12 carbon atoms and $R^1$ is methyl.

In preferred embodiments $R^1$ is an alkyl group having 1-10 carbon atoms or is even more preferably a methyl group. In certain embodiments $R^2$ is an alkyl group having 2-50 carbon atoms, or an alkyl group having 5-20 carbon atoms, or preferably an alkyl group having 6-18 carbon atoms or more preferably an alkyl group having 8-12 carbon atoms.

In all of the foregoing embodiments the transmission fluid composition may exhibit a change in color lightness. The lightness of a fluid can be measured on a spectrophotometer such as the ColorQuest®XE Spectrophotometer and is defined as the L value (on the LAB scale). The weight percentage of thiadiazole is given based on the total weight of the transmission fluid composition. For the aforementioned fluids at a content of at least 0.15 wt. % of at least one thiadiazole compound, after ageing the fluid at 150° C. for 72 hours, ΔL* is −12 to 0, more preferably between −11 to −0.5, or even more preferably between −10 to −1. ΔL* is determined by the following formula $\Delta L^* = L^*_{aged\ fluid} - L^*_{fresh\ fluid}$.

In all of the foregoing embodiments of the transmission fluid composition the base oil may comprise from 60 wt. % to 98 wt. %, or more preferably from 70 wt. % to 96 wt. %, or, more preferably from 75 wt. % to 95 wt. % of the total weight of the transmission fluid composition.

In all of the foregoing embodiments, the sulfur content delivered to the transmission fluid composition by at least one thiadiazole compound of Formulas (I)-(II) is 50-10,000 ppm, more preferably 300-2500, ppm, and even more preferably 400-2,000 ppm or 400-1,000 ppm.

In all of the foregoing embodiments, the total sulfur content of the transmission fluid composition is 50-12,000 ppm.

In another embodiment, the invention relates to an automatic transmission containing any of the foregoing transmission fluid compositions. The automatic transmission is selected from the group consisting of a continuously variable transmission, step type transmission or double clutch transmission.

In a still further embodiment, the invention relates to a vehicle comprising an engine and a transmission, the transmission including any of the foregoing transmission fluid compositions.

In a still further embodiment, the invention relates to a method of operating a transmission lubricated with any of the foregoing transmission fluid compositions.

In yet another embodiment, the invention relates to an additive composition for a transmission fluid, the additive composition comprising one of (a) a reaction product of thiadiazole of one of the formulae (III) and (IV):

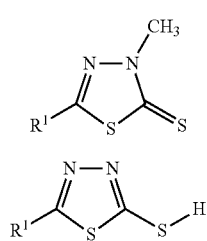

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source; and (b) at least one color stable extreme pressure performance improver from a compound of the Formulas (I)-(II):

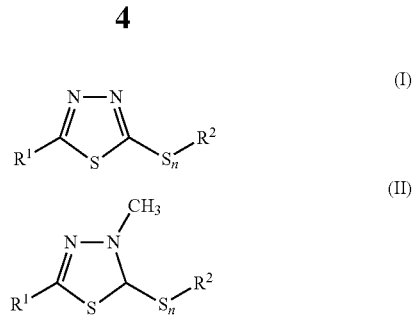

wherein n is 1-5; $R^1$ is a substituted or unsubstituted hydrocarbyl group having 1-100 carbon atoms; and $R^2$ is a hydrogen or is a substituted or unsubstituted hydrocarbyl group having 1-100 carbon atoms. The additive composition may be used to improve extreme pressure characteristics while maintaining color stability of a transmission fluid composition A further embodiment of the invention involves the use of one of (a) a reaction product of thiadiazole of one of the formulae (III) and (IV):

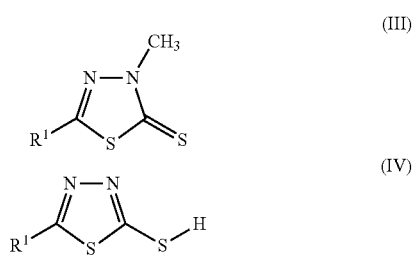

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source; and (b) at least one compound of the Formulas (I)-(II):

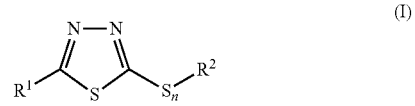

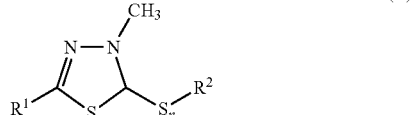

wherein n is 1-5; $R^1$ is a substituted or unsubstituted hydrocarbyl group having 1-100 carbon atoms; and $R^2$ is hydrogen or a substituted or unsubstituted hydrocarbyl group having 1-100 carbon atoms for providing extreme pressure protection to an automatic transmission.

Additional features and advantages of the disclosure may be set forth in part in the description which follows, and/or may be learned by practice of the disclosure. The features and advantages of the disclosure may be further realized and attained by means of the elements and combinations particularly pointed out in the appended claims.

It is to be understood that both the foregoing general description and the following detailed description are exemplary and explanatory only and are not restrictive of the disclosure, as claimed.

DETAILED DESCRIPTION OF THE INVENTION

As used herein, the term "hydrocarbyl" is used in its ordinary sense, which is well-known to those skilled in the art. Specifically, it refers to a group having a carbon atom directly attached to the remainder of the molecule and having predominantly hydrocarbon character. The hydrocarbyl may have 1-100 carbon atoms, preferably 1-50 carbon atoms, more preferably 1-20 carbon atoms, and in some cases preferably 1-10 carbon atoms or 8-12 carbon atoms or 1 carbon atom. Examples of hydrocarbyl groups include:

(a) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic moiety);

(b) substituted hydrocarbon substituents, that is, substituents containing non-hydrocarbon groups which, in the context of this disclosure, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); and (c) hetero substituents, that is, substituents which, while having a predominantly hydrocarbon character, in the context of this disclosure, contain other than carbon in a ring or chain otherwise composed of carbon atoms. Heteroatoms may include sulfur, oxygen, and nitrogen, and encompass substituents such as pyridyl, furyl, thienyl, and imidazolyl. In general, no more than two, for example, no more than one, non-hydrocarbon substituent will be present for every ten carbon atoms in the hydrocarbyl group; typically, there will be no non-hydrocarbon substituents in the hydrocarbyl group.

"Alkyl" refers to and includes saturated linear, branched, or cyclic hydrocarbon structures and combinations thereof. Particular alkyl groups are those having 1 to 100 carbon atoms. More particular alkyl groups are those having 1 to 20 carbon atoms, and even more particularly 1-18 carbon atoms. When an alkyl residue having a specific number of carbons is named, all geometric isomers having that number of carbons are intended to be encompassed and described; thus, for example, "butyl" is meant to include n-butyl, sec-butyl, iso-butyl, tert-butyl and cyclobutyl; "propyl" includes n-propyl, iso-propyl and cyclopropyl. This term is exemplified by groups such as methyl, t-butyl, n-heptyl, octyl, nonyl, dodecyl, cyclohexylmethyl, cyclopropyl and the like. Cycloalkyl is a subset of alkyl and can consist of one ring, such as cyclohexyl, or multiple rings, such as adamantyl. A cycloalkyl comprising more than one ring may be fused, spiro or bridged, or combinations thereof. In fused ring systems, one or more of the rings can be aryl or heteroaryl. A cycloalkyl having more than one ring where at least one ring is aromatic may be connected to the parent structure at either a non-aromatic ring position or at an aromatic ring position. In one variation, a cycloalkyl having more than one ring where at least one ring is aromatic is connected to the parent structure at a non-aromatic ring position. A preferred cycloalkyl is a saturated cyclic hydrocarbon having from 3 to 13 annular carbon atoms. A more preferred cycloalkyl is a saturated cyclic hydrocarbon having from 3 to 7 annular carbon atoms. Examples of cycloalkyl groups include adamantyl, decahydronaphthalenyl, cyclopropyl, cyclobutyl, cyclopentyl and the like.

"Alkenyl" refers to an unsaturated hydrocarbon group having at least one site of olefinic unsaturation (i.e., having at least one moiety of the formula C=C) and preferably having 1 to 100 carbon atoms. More particular alkenyl groups are those having 1 to 20 carbon atoms, and even more particularly 1-18 carbon atoms. Examples of alkenyl include but are not limited to propenyl, octenyl, nonenyl, and oleoyl.

"Alkynyl" refers to an unsaturated hydrocarbon group having at least one site of acetylinic unsaturation (i.e., having at least one moiety of the formula C≡C) and preferably having 1 to 100 carbon atoms. More particular alkenyl groups are those having 1 to 20 carbon atoms, and even more particularly 1-18 carbon atoms.

"Acyl" refers to substituted or unsubstituted groups selected from H—C(O)—, alkyl-C(O)—, alkenyl-C(O)—, alkynyl-C(O)—, aryl-C(O)—, heteroaryl-C(O)—, and heterocyclic-C(O)—.

"Acyloxy" refers to substituted or unsubstituted groups selected from H—C(O)O—, alkyl-C(O)O—, alkenyl-C(O)O—, alkynyl-C(O)O—, aryl-C(O)O—, heteroaryl-C(O)O—, and heterocyclic-C(O)O—.

"Heterocycle", "heterocyclic", or "heterocyclyl" refers to a saturated or an unsaturated non-aromatic group having a single ring or multiple condensed rings, and having from 1 to 10 annular carbon atoms and from 1 to 4 annular heteroatoms, such as nitrogen, sulfur or oxygen. A heterocycle comprising more than one ring may be fused, spiro or bridged, or any combination thereof. In fused ring systems, one or more of the rings can be aryl or heteroaryl. A heterocycle having more than one ring where at least one ring is aromatic may be connected to the parent structure at either a non-aromatic ring position or at an aromatic ring position. In one variation, a heterocycle having more than one ring where at least one ring is aromatic is connected to the parent structure at a non-aromatic ring position.

"Aryl" refers to an unsaturated aromatic carbocyclic group having a single ring (e.g., phenyl) or multiple condensed rings (e.g., naphthyl or anthryl) which condensed rings may or may not be aromatic. In one variation, the aryl group contains from 6 to 14 annular carbon atoms. An aryl group having more than one ring where at least one ring is non-aromatic may be connected to the parent structure at either an aromatic ring position or at a non-aromatic ring position. In one variation, an aryl group having more than one ring where at least one ring is non-aromatic is connected to the parent structure at an aromatic ring position.

"Heteroaryl" refers to an unsaturated aromatic carbocyclic group having from 2 to 10 annular carbon atoms and at least one annular heteroatom, including but not limited to heteroatoms such as nitrogen, oxygen and sulfur. A heteroaryl group may have a single ring (e.g., pyridyl, furyl) or multiple condensed rings (e.g., indolizinyl, benzothienyl) which condensed rings may or may not be aromatic. A heteroaryl group having more than one ring where at least one ring is non-aromatic may be connected to the parent structure at either an aromatic ring position or at a non-aromatic ring position. In one variation, a heteroaryl group having more than one ring where at least one ring is non-aromatic is connected to the parent structure at an aromatic ring position.

"Aralkyl" refers to a residue in which an aryl moiety is attached to an alkyl residue and wherein the aralkyl group may be attached to the parent structure at either the aryl or the alkyl residue. Preferably, an aralkyl is connected to the parent structure via the alkyl moiety. A "substituted aralkyl" refers to a residue in which an aryl moiety is attached to a substituted alkyl residue and wherein the aralkyl group may be attached to the parent structure at either the aryl or the alkyl residue.

"Alkoxy" refers to the group alkyl-O—, which includes, by way of example, methoxy, ethoxy, n-propoxy, iso-propoxy, n-butoxy, tert-butoxy, sec-butoxy, n-pentoxy, n-hexoxy, 1,2-dimethylbutoxy, and the like. Similarly, alkenyloxy refers to the group "alkenyl-O—" and alkynyloxy refers to the group "alkynyl-O—". "Substituted alkoxy" refers to the group substituted alkyl-O.

As used herein, the term "percent by weight", unless expressly stated otherwise, means the percentage the recited component represents with respect to the total weight of the composition containing the recited component.

The terms "oil-soluble" or "dispersible" used herein do not necessarily indicate that the compounds or additives are soluble, dissolvable, miscible, or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

It is to be understood that throughout the present disclosure, the terms "comprises," "includes," "contains," etc. are considered open-ended and include any element, step, or ingredient not explicitly listed. The phrase "consists essentially of" is meant to include any expressly listed element, step, or ingredient and any additional elements, steps, or ingredients that do not materially affect the basic and novel aspects of the invention. The basic and novel aspects of the invention include extreme pressure antiwear properties and color stability.

The Transmission Fluid Composition

In one aspect, the invention relates to a transmission fluid composition including from 50% to 99% of a base oil as described above and one of (a) a reaction product of thiadiazole of one of the formulae (III) and (IV):

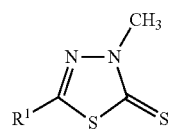
(III)

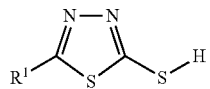
(IV)

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source; and
(b) an additive composition comprising at least one compound selected from compounds of the Formulas (I)-(II)

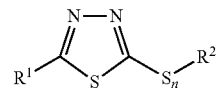
(I)

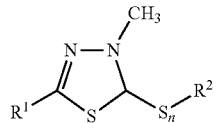
(II)

wherein n is 1-5; $R^1$ is a substituted or unsubstituted hydrocarbyl group having 1-100 carbon atoms; and $R^2$ is hydrogen or a substituted or unsubstituted hydrocarbyl group having 1-100 carbon atoms.

The Base Oil

Base oils suitable for use in formulating transmission fluid compositions according to the disclosure may be selected from any of suitable synthetic or natural oils or mixtures thereof having a suitable lubricating viscosity. Natural oils may include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale may also be suitable. The base oil typically may have a viscosity of 2 to 15 cSt or, as a further example, 2 to 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500-1000, diethyl ether of polypropylene glycol having a molecular weight of 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di-(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Hence, the base oil used which may be used to make the transmission fluid compositions as described herein may be a single base oil or may be a mixture of two or more base oils. In particular, the one or more base oil(s) may desirably be selected from any of the base oils in Groups I-V as specified in the American Petroleum Institute (API) Base Oil Interchangeability Guidelines. Such base oil groups are as follows:

TABLE 1

| Base oil Category | Sulfur (%) | | Saturates (%) | Viscosity Index |
| --- | --- | --- | --- | --- |
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

In one variation, the base oil is primarily a Group III base oil.

The base oil may contain a minor or major amount of a poly-alpha-olefin (PAO). Typically, the poly-alpha-olefins are derived from monomers having from 4 to 30, or from 4 to 20, or from 6 to 16 carbon atoms. Examples of useful PAOs include those derived from octene, decene, mixtures thereof, and the like. PAOs may have a viscosity of from 2 to 15, or from 3 to 12, or from 4 to 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with an additive composition as disclosed in embodiments herein to provide multi-vehicle transmission fluid compositions. Accordingly, the base oil may be present in the fluid composition described herein in an amount ranging from more than 30 wt. % to 95 wt. %, for example, from 40 wt. % to 90 wt. %, and typically more than 50 wt. % based on a total weight of the fluid composition.

The Thiadiazole Extreme Pressure Agent

The thiadiazole extreme pressure agent useful in the transmission fluid compositions of the invention includes at least one compound selected from compounds of the Formulas (I)-(II)

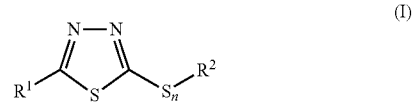

(I)

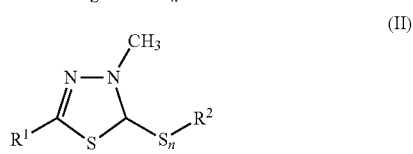

(II)

wherein n is 1-5; $R^1$ is a substituted or unsubstituted hydrocarbyl group having 1-100 carbon atoms; and $R^2$ is hydrogen or a substituted or unsubstituted hydrocarbyl group having 1-100 carbon atoms.

The thiadiazole extreme pressure component of the present invention may also be the reaction product of thiadiazole of one of the formulae (III) and (IV):

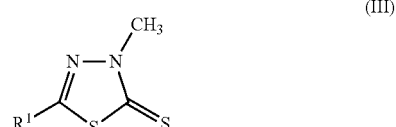

(III)

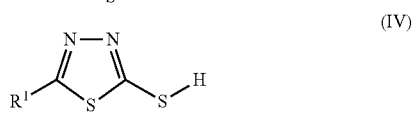

(IV)

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source. Examples IV, VII, VIII and X of U.S. Pat. Nos. 2,719,125 and 2,719,126 show examples of a suitable additional sulfur source that is added during or after reaction of thiadiazole and thiol.

In certain embodiments $R^1$ is an alkyl group having 2-50 carbon atoms, or an alkyl group having 5-20 carbon atoms, or preferably an alkyl group having 1-10 carbon atoms, or most preferably a methyl group. In certain embodiments $R^2$ is an alkyl group having 2-50 carbon atoms, or an alkyl group having 3-30 carbon atoms, or an alkyl group having 5-20 carbon atoms, or preferably an alkyl group having 6 to 18 carbon atoms, or most preferably an alkyl group having 8-12 carbon atoms.

Particularly suitable and preferred compounds of the Formula (I) are:

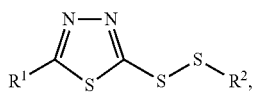

wherein $R^1$ is methyl and $R^2$ is a hydrocarbyl group having 8-12 carbon atoms.

In some embodiments, thiadiazoles represented by the Formulas (I)-(II) may have an $R^1$ group comprising from 1-10 carbon atoms when n is 2. In such embodiments, the thiadiazole compounds represented by Formulas (I)-(II) may preferably have an $R^2$ group comprising from 6 to 18 carbon atoms, or more preferably, 8 to 12 carbon atoms.

Conventional Extreme Pressure/Antiwear Additives

In aspects of the invention, conventional sulfur-containing extreme pressure/antiwear additive components may be added to the transmission fluid composition as long as these additive components do not significantly darken the transmission fluid composition prematurely. Sulfur-containing extreme pressure/antiwear additives include, but are not limited to thiazoles and triazoles. Examples of such compounds include benzotriazole, tolyltriazole, octyltriazole, decyltriazole, dodecyltriazole, 2-mercapto benzothiazole.

Friction Modifiers

Another component that can be added to the transmission fluid composition is a friction modifier. Friction modifiers are used in the transmission fluid compositions as described herein to decrease or increase friction between surfaces (e.g., the members of a torque converter clutch or a shifting clutch) at low sliding speeds. Typically, the desired result is a friction-vs.-velocity (µ-v) curve that has a positive slope, which in turn leads to smooth clutch engagements minimizing "stick-slip" behavior (e.g., shudder, noise, and harsh shifts).

Friction modifiers include such compounds as aliphatic amines or ethoxylated aliphatic amines, ether amines, alkoxylated ether amines, sarcosine compounds, aliphatic fatty acid amides, acylated amines, aliphatic carboxylic acids, aliphatic carboxylic esters, polyol esters, aliphatic carboxylic ester-amides, imidazolines, tertiary amines, aliphatic phosphonates, aliphatic phosphates, aliphatic thiophosphonates, aliphatic thiophosphates, etc., wherein the aliphatic group usually contains one or more carbon atoms so as to render the compound suitably oil soluble. As a further example, the aliphatic group may contain 8 or more carbon atoms. Also suitable are aliphatic substituted succinimides formed by reacting one or more aliphatic succinic acids or anhydrides with ammonia primary amines.

The friction modifier is desirably present in the transmission fluid composition in an amount that is sufficient to provide from 50 to 800 ppm, and desirably from 150 to 500 ppm by weight nitrogen to the transmission fluid composition based on a total weight of the transmission fluid composition.

Other friction modifier compounds may also be included in the transmission fluid compositions described herein. For example, one group of friction modifiers includes the N-aliphatic hydrocarbyl-substituted diethanol amines in which the N-aliphatic hydrocarbyl-substituent is at least one straight chain aliphatic hydrocarbyl group free of acetylenic unsaturation and having in the range of 14 to 20 carbon atoms.

Another friction modifier that may be used is based on a combination of (i) at least one di(hydroxyalkyl) aliphatic tertiary amine in which the hydroxyalkyl groups, being the same or different, each contain from 2 to 4 carbon atoms, and in which the aliphatic group is an acyclic hydrocarbyl group containing from 10 to 25 carbon atoms, and (ii) at least one hydroxyalkyl aliphatic imidazoline in which the hydroxyalkyl group contains from 2 to 4 carbon atoms, and in which the aliphatic group is an acyclic hydrocarbyl group containing from 10 to 25 carbon atoms. For further details concerning this friction modifier system, reference should be made to U.S. Pat. No. 5,344,579.

Generally speaking, the transmission fluid composition described herein may suitably contain up to 2.5 wt. %, desirably from 0.05 wt. % to 2.2 wt. %, and preferably up to 1.8 wt. %, or up to only 1.25 wt %, or, as a further example, most preferably from 0.75 to 1 wt % of one or more total friction modifiers in the transmission fluid composition.

Other Optional Components

The transmission fluid composition described herein may also include conventional additives of the type used in automatic transmission fluid compositions in addition to the components described above. Such additives include, but are not limited to, dispersant additive, detergent additive, antioxidants, corrosion inhibitors, antirust additives, metal deactivators, antifoamants, pour point depressants, air entrainment additives, seal swell agents, and the like.

Dispersant Additive

A dispersant additive that may be used may be a reaction product of a hydrocarbyl-dicarboxylic acid or anhydride and a polyamine. The hydrocarbyl moiety of the hydrocarbyl-dicarboxylic acid or anhydride of may be derived from butene polymers, for example polymers of isobutylene. Suitable polyisobutenes for use herein include those formed from polyisobutylene or highly reactive polyisobutylene having at least 60%, such as 70% to 90% and above, terminal vinylidene content. Suitable polyisobutenes may include those prepared using $BF_3$ catalysts. The average number molecular weight of the polyalkenyl substituent may vary over a wide range, for example from 100 to 5000, such as from 500 to 5000, as determined by gel permeation chromatography (GPC) as described above.

The dicarboxylic acid or anhydride of may be selected from carboxylic reactants other than maleic anhydride, such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters. A mole ratio of maleic anhydride to hydrocarbyl moiety in a reaction mixture used to make the hydrocarbyl-dicarboxylic acid or anhydride may vary widely. Accordingly, the mole ratio may vary from 5:1 to 1:5, for example from 3:1 to 1:3. A particularly suitable molar ratio of anhydride to hydrocarbyl moiety is from 1:1 to less than 1.6:1.

Any of numerous polyamines can be used as in preparing the dispersant additive. Non-limiting exemplary polyamines may include aminoguanidine bicarbonate (AGBC), diethylene triamine (DETA), triethylene tetramine (TETA), tetraethylene pentamine (TEPA), pentaethylene hexamine (PEHA) and heavy polyamines. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting polyamines which may be used to prepare the hydrocarbyl-substituted succinimide dispersant are disclosed in U.S. Pat. No. 6,548,458, the disclosure of which is incorporated herein by reference in its entirety. In an embodiment of the disclosure, the polyamine may be selected from tetraethylene pentamine (TEPA).

In an embodiment, the dispersant additive may be compounds of Formula (V):

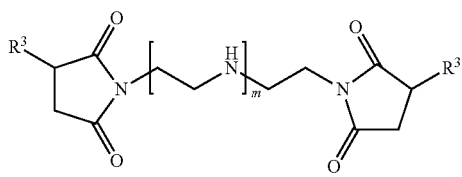

(V)

wherein m represents 0 or an integer of from 1 to 5, and $R^3$ is a hydrocarbyl substituent as defined above. In an embodiment, m is 3 and $R^3$ is a polyisobutenyl substituent, such as that derived from polyisobutylenes having at least 60%, such as 70% to 90% and above, terminal vinylidene content. Compounds of Formula (V) may be the reaction product of a hydrocarbyl-substituted succinic anhydride, such as a polyisobutenyl succinic anhydride (PIBSA), and a polyamine, for example tetraethylene pentamine (TEPA).

The foregoing compound of Formula (V) may have a molar ratio of (A) polyisobutenyl-substituted succinic anhydride to (B) polyamine in the range of 4:3 to 1:10 in the compound. A particularly useful dispersant contains polyisobutenyl group of the polyisobutenyl-substituted succinic anhydride having a number average molecular weight (Mn) in the range of from 500 to 5000 as determined by GPC and a (B) polyamine having a general formula $H_2N(CH_2)_x$—$[NH(CH_2)_x]_y$—$NH_2$, wherein x is in the range from 2 to 4 and y is in the range of from 1 to 2.

The dispersant additive described herein may be boronated and/or phosphorylated. Accordingly, in one embodiment, the dispersant additive has a nitrogen content up to 10,000 ppm by weight, for example from 0.5 to 0.8 wt. % and a boron plus phosphorus to nitrogen ((B+P)/N) weight ratio of from 0:1 to 0.8:1. The amount of dispersant in the transmission fluid composition may range from 300 to 1000 ppm by weight for example, and more preferably, from 400 to 900 ppm by weight in terms of nitrogen based on a total weight of the transmission fluid composition.

Metal Detergents

Metal detergents that may be included in the transmission fluid compositions described herein may generally comprise a polar head with a long hydrophobic tail where the polar head comprises a metal salt of an acidic organic compound. The salts may contain a substantially stoichiometric amount of the metal, in which case they are usually described as normal or neutral salts, and would typically have a total base number or TBN (as measured by ASTM D2896) of from 0 to less than 150. Large amounts of a metal base may be included by reacting an excess of a metal compound such as an oxide or hydroxide with an acidic gas such as carbon dioxide. The resulting overbased detergent comprises micelles of neutralized detergent surrounding a core of inorganic metal base (e.g., hydrated carbonates). Such overbased detergents may have a TBN of 150 or greater, such as from 150 to 450 or more.

Detergents that may be suitable for use in the present embodiments include oil-soluble overbased, low base, and neutral sulfonates, phenates, sulfurized phenates, and salicylates of a metal, particularly the alkali or alkaline earth metals, e.g., sodium, potassium, lithium, calcium, and magnesium. More than one metal may be present, for example, both calcium and magnesium. Mixtures of calcium and/or magnesium with sodium may also be suitable. Suitable metal detergents may be overbased calcium or magnesium sulfonates having a TBN of from 150 to 450 TBN, overbased calcium or magnesium phenates or sulfurized phenates having a TBN of from 150 to 300 TBN, and overbased calcium or magnesium salicylates having a TBN of from 130 to 350. Mixtures of such salts may also be used.

The metal-containing detergent may be present in a transmission fluid composition in an amount sufficient to improve the anti-rust performance of the transmission fluid composition. For example, the amount of detergent in the transmission fluid composition may range from 0.5 wt % to 5 wt %. As a further example, the metal-containing detergent may preferably be present in an amount of from 1.0 wt % to 3.0 wt %. The metal-containing detergent may be present in a transmission fluid composition in an amount sufficient to provide from 10 to 5000 ppm alkali and/or alkaline earth metal based on a total weight of the transmission fluid composition. As a further preferred example, the metal-containing detergent may be present in a transmission fluid composition in an amount sufficient to provide from 40 to 900 ppm alkali and/or alkaline earth metal. A particularly preferred amount of detergent in the transmission fluid composition may provide from 60 to 600 ppm of alkali and/or alkaline earth metal to the transmission fluid composition.

Corrosion Inhibitors

Rust or corrosion inhibitors may also be included in the transmission fluid compositions described herein. Such materials include monocarboxylic acids and polycarboxylic acids. Examples of suitable monocarboxylic acids are octanoic acid, decanoic acid and dodecanoic acid. Suitable polycarboxylic acids include dimer and trimer acids such as are produced from such acids as tall oil fatty acids, oleic acid, linoleic acid, or the like.

Another useful type of rust inhibitor may comprise alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Other suitable rust or corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof, and the like. Mixtures of such rust or corrosion inhibitors may be used. The total amount of corrosion inhibitor in the transmission fluid composition described herein may range from 0.01 to 2.0 wt % based on the total weight of the transmission fluid composition composition.

Antioxidants

In some embodiments, antioxidant compounds may be included in the transmission fluid composition described herein. Antioxidants include phenolic antioxidants, aromatic amine antioxidants, sulfurized phenolic antioxidants, and organic phosphites, among others. Examples of phenolic antioxidants include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl6-ter-t-butylphenol), mixed methylene-bridged polyalkyl phenols, and 4,4'-thiobis(2-methyl-6-tert-butylphenol). N,N'-di-sec-butyl-phenylenediamine, 4-isopropylaminodiphenylamine, phenyl-.alpha.-naphthyl amine, phenyl-.alpha.-naphthyl amine, and ring-alkylated diphenylamines. Examples include the sterically hindered tertiary butylated phenols, bisphenols and cinnamic acid derivatives and combinations thereof.

Aromatic amine antioxidants include, but are not limited to diarylamines having the formula:

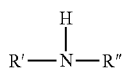

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

Examples of diarylamines that may be used include, but are not limited to: diphenylamine; various alkylated diphenylamines; 3-hydroxydiphenylamine; N-phenyl-1,2-phenylenediamine; N-phenyl-1,4-phenylenediamine; monobutyldiphenyl-amine; dibutyldiphenylamine; monooctyldiphenylamine; dioctyldiphenylamine; mononyldiphenylamine; dinonyldiphenylamine; monotetradecyldiphenylamine; ditetradecyldiphenylamine, phenyl-alpha-naphthylamine; monooctyl phenyl-alpha-naphthylamine; phenyl-beta-naphthylamine; monoheptyldiphenylamine; diheptyl-diphenylamine; p-oriented styrenated diphenylamine; mixed butyloctyldi-phenylamine; and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any $C_4$ to $C_{25}$ alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The amount of sulfurized olefin or sulfurized fatty oil delivered to the finished transmission fluid composition is based on the sulfur content of the sulfurized olefin or fatty oil and the desired level of sulfur to be delivered to the finished transmission fluid composition. For example, a sulfurized fatty oil or olefin containing 20 weight % sulfur, when added to the finished transmission fluid composition at a 1.0 weight % treat level, will deliver 2000 ppm of sulfur to the finished transmission fluid composition. A sulfurized fatty oil or olefin containing 10 weight % sulfur, when added to the finished transmission fluid composition at a 1.0 weight % treat level, will deliver 1000 ppm sulfur to the finished transmission fluid composition. It is desirable that the sulfurized olefin or sulfurized fatty oil to deliver between 200 ppm and 2000 ppm sulfur to the finished transmission fluid composition. The total amount of antioxidant in the transmission fluid compositions described herein may range from 0.01 to 3.0 wt % based on the total weight of the transmission fluid composition. As a further example, antioxidant may be present in a preferred amount of from 0.1 wt % to 1.0 wt %.

Seal Swell Agents

The transmission fluid composition described herein may optionally contain seal swell agents such as alcohols, alkylbenzenes, substituted sulfolanes or mineral oils that cause swelling of elastomeric materials. Alcohol-type seal swell agents are low volatility linear alkyl alcohols. Examples of suitable alcohols include decyl alcohol, tridecyl alcohol and tetradecyl alcohol. Examples of alkylbenzenes useful as seal swell agents for use in conjunction with the compositions described herein include dodecylbenzenes, tetradecylbenzenes, dinonyl-benzenes, di(2-ethylhexyl)benzene, and the like. Examples of substituted sulfolanes are described in U.S. Pat. No. 4,029,588, incorporated herein by reference. Mineral oils useful as seal swell agents are typically low viscosity mineral oils with high naphthenic or aromatic content. When used in the transmission fluid composition described herein, a seal swell agent will typically comprise from 1 to 30 wt. %, preferably from 2 to 20 wt. %, most preferably from 5 to 15 wt. %, based on the total weight of the transmission fluid composition.

Anti-Foam Agents

In some embodiments, a foam inhibitor may form another component suitable for use in the transmission fluid compositions described herein. Foam inhibitors may be selected from silicones, polyacrylates, and the like. The amount of antifoam agent in the transmission fluid compositions described herein may range from 0.001 wt % to 0.1 wt % based on the total weight of the transmission fluid composition. As a further example, antifoam agent may be present in a preferred amount of from 0.004 wt % to 0.10 wt %.

Additives used in formulating the transmission fluid compositions described herein can be blended into the base oil individually or in various sub-combinations. However, it is suitable to blend all of the components concurrently using an additive concentrate (i.e., additives plus a diluent, such as a hydrocarbon solvent). The use of an additive concentrate takes advantage of the mutual compatibility afforded by the combination of ingredients when in the form of an additive concentrate. Also, the use of a concentrate reduces blending time and lessens the possibility of blending errors.

In general terms, a suitable transmission fluid composition may include additive components in the ranges listed in the following table:

TABLE 2

| Component | Wt. % (Suitable Embodiments) | Wt. % (Preferred Embodiments) |
| --- | --- | --- |
| Dispersant(s) | 0.5-20.0 | 1.0-15.0 |
| Antioxidant(s) | 0-2.0 | 0.01-1.0 |
| Metal Detergent(s) | 0.1-10.0 | 0.5-5.0 |
| Corrosion inhibitor(s) | 0.0-5.0 | 0.0-2.0 |
| Extreme Pressure/Antiwear Agent(s) | 0.0001-10 | 0.01-2.0 |
| Antifoaming agent(s) | 0.0-1.0 | 0.001-0.1 |
| Friction Modifier(s) | 0-2.0 | 0.05-1.0 |
| Viscosity index improver(s) | 0.0-30.0 | 0.1-8 |
| Pour point depressant(s) | 0.001-1.0 | 0.01-0.5 |
| Seal swell agent(s) | 0-10.0 | 0.5-5.0 |
| Base oil(s) | Balance | Balance |
| Total | 100 | 100 |

An aspect of the invention includes an automatic transmission containing the transmission fluid composition comprising a base oil and an additive composition comprising (a) reaction product of thiadiazole of one of the formulae (III) and (IV):

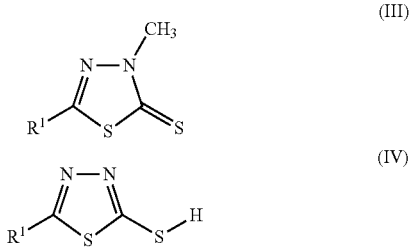

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source, or (b) at least one thiadiazole compound selected from Formulas (I)-(II). The automatic transmission can be a continuously variable transmission, step type transmission or double clutch transmission.

Another aspect of the invention includes a method of operating a transmission comprising: operating the transmission in the presence of a composition comprising a base oil and an additive composition comprising (a) a reaction product of thiadiazole of one of the formulae (III) and (IV):

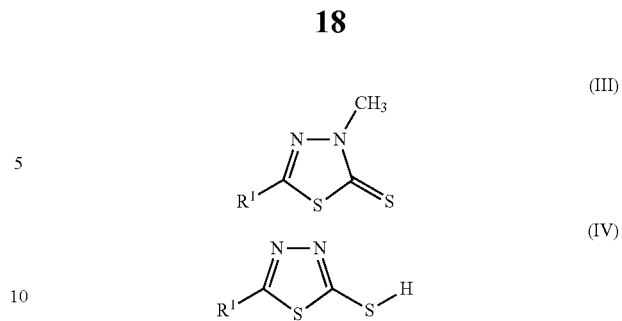

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source, or (b) at least one thidiazole compound selected from Formulas (I)-(II).

In addition, an aspect of the invention includes a vehicle comprising an engine and a transmission, wherein the transmission includes a transmission fluid composition comprising a base oil and an additive composition comprising (a) a reaction product of thiadiazole of one of the formulae (III) and (IV):

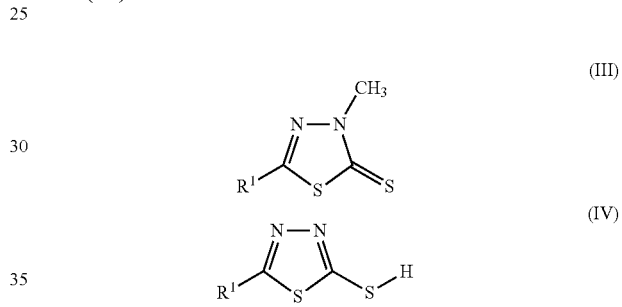

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source, or (b) at least one thiadiazole compound selected from Formulas (I)-(II).

Also, an aspect of the invention includes the use of (a) the reaction product of thiadiazole of one of the formulae (III) and (IV):

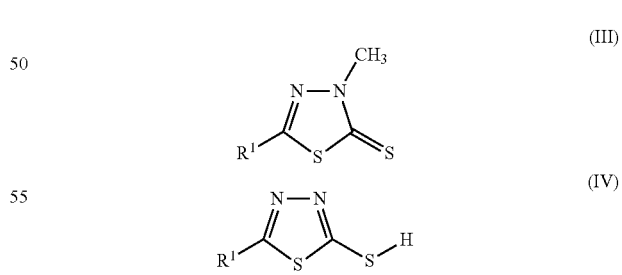

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source, or at least one thiadiazole compound selected from Formulas (I)-(II) to improve extreme pressure characteristics while maintaining color stability of the transmission fluid composition.

Properties of the Transmission Fluid Composition

As mentioned above, the problem of darkening has been observed in conventional transmission fluids containing DMTD compounds. Even though the wear characteristics have not diminished in these transmission fluids, the typical user who notices the darkened fluid assumes that the transmission fluid is no longer functioning properly, and prematurely replaces the transmission fluid. Without being bound by theory, it is believed that the DMTD compounds which are conventionally used oligomerize/polymerize or decompose during use thereby darkening the transmission fluid. On the other hand, the unique structure of the inventive thiadiazole compound of the Formulas (I)-(II) having a hydrocarbyl group at the 5-position blocks the pathway for oligomerization/polymerization or decomposition. It was surprising to find that the inventive thiadiazole compound of the Formulas (I)-(II) not only provides the transmission fluid composition with sufficient antiwear properties at extreme pressures, but it also provides color stability even at high treat rates.

One way to measure the color stability of the transmission fluid compositions containing thiadiazoles is to test for ΔL. A more negative ΔL value indicates an increase in darkness. In an aspect of the invention, the transmission fluid composition comprising the base oil and an additive composition comprising at least one thiadiazole compound of the Formulas (I)-(II) has a property wherein the ΔL (150° C., 72 hr) is −12 or higher at a content of at least 0.15 wt % of the at least one thiadiazole compound of the Formulas (I)-(II). Preferably, the ΔL is −11 to −0.5 and more preferably −10 to −1 at a content of at least 0.15 wt % of the at least one thiadiazole compound of the Formulas (I)-(II).

EXAMPLES

General Preparation of the Thiadiazole Compound of the Formulas (I)-(II)

The thiadiazole compound of inventive Formula (I) having a monomercapto thiadiazole core can be prepared from a 5-hydrocarbyl-2-mercapto thiadiazole. The 5-hydrocarbyl-2-mercapto thiadiazole can be prepared using the process described by Saha et al. ("Green Synthesis of 5-substituted-1,3,4-thiadiazole-2-thiols", J. Heterocyclic Chem., 2010, 47, 838), and some of these are commercially available, such as 2-Mercapto-5-methyl-1,3,4-thiadiazole (Sigma-Aldrich Co. LLC.).

The 5-hydrocarbyl-2-mercapto thiadiazole can then be substituted at the 2-mercapto position with a hydrocarbyl group using the steps taught in: a) U.S. Pat. No. 3,087,932 or Hipler et al, J. Mol. Structure, 2003, 658, 179-191, by oxidative coupling with hydrogen peroxide and an alkyl mercaptan; b) U.S. Pat. No. 2,764,547, by reaction with an olefin; and c) U.S. Pat. No. 2,719,125 by reaction with an alkyl halide.

In each of Inventive Examples 1-4 below, the thiadiazole derivatives of inventive the Formulas (I)-(II) were prepared by substituting the mercapto group of the monomercapto thiadiazole core using oxidative coupling with hydrogen peroxide and an alkyl mercaptan as taught by Hipler et al.

Inventive Example 1

2-Mercapto-5-methyl-1,3,4-thiadiazole (purchased from Sigma-Aldrich Co. LLC.; 4 mol), t-nonyl thiol (4 mol), EtOH (950 g), and $H_2O$ (1200 g) are charged into a 3-neck 1-L round bottom flask. The flask is then equipped with overhead stirring, a claisen adapter with a thermocouple and a condenser, and an adapter with nitrogen in flow. An outlet adapter is connected to the condenser and flows to a 15-20% NaOH scrubber and a bleach scrubber. The $H_2O_2$ (35 wt %, 388.5 g) is then weighed into an addition funnel and is connected at the nitrogen in flow. The reaction mixture is heated to 60° C. The heating mantel is turned off and removed. The $H_2O_2$ is then added drop wise (over about 3 hours) keeping the temperature around 60° C. with an ice bath as necessary. After the addition is complete, the reaction is brought to about 80° C. and refluxed for about 1-3 h. The heating mantel is then removed and the reaction mixture is allowed to cool. The aqueous phase is then decanted off as much as possible. A separatory funnel may be used. The remaining volatiles are then removed under reduced pressure. The final product is used without further purification.

Inventive Example 2

2-Mercapto-5-methyl-1,3,4-thiadiazole (purchased from Sigma-Aldrich Co. LLC.; 0.5 mol), n-octyl thiol (0.5 mol), EtOH (150 g), and $H_2O$ (150 g) are charged into a 3-neck 1-L round bottom flask. The flask is then equipped with overhead stirring, a claisen adapter with a thermocouple and a condenser, and an adapter with nitrogen in flow. An outlet adapter is connected to the condenser and flows to a 15-20% NaOH scrubber and a bleach scrubber. The $H_2O_2$ (35 wt %, 48.6 g) is then weighed into an addition funnel and is connected at the nitrogen in flow. The reaction mixture is heated to 60° C. The heating mantel is turned off and removed. The $H_2O_2$ is then added drop wise (over about 1 h) keeping the temperature around 60° C. with an ice bath as necessary. After the addition is complete, the reaction is brought to about 80° C. and refluxed for about 7 h.

The heating mantel is then removed and the reaction mixture is allowed to cool to around 60° C. The aqueous phase is then decanted off as much as possible. A separatory funnel may be used. The remaining volatiles are then removed under reduced pressure. The final product is used without further purification.

Inventive Example 3

2-Mercapto-5-methyl-1,3,4-thiadiazole (purchased from Sigma-Aldrich Co. LLC.; 0.5 mol), n-dodecyl thiol (0.5 mol), EtOH (150 g), and $H_2O$ (150 g) are charged to a 3-neck 1-L round bottom flask. The flask is then equipped with overhead stirring, a claisen adapter with a thermocouple and a condenser, and an adapter with nitrogen in flow. An outlet adapter is connected to the condenser and flows to a 15-20% NaOH scrubber and a bleach scrubber. The $H_2O_2$ (35 wt %, 48.9 g) is then weighed into an addition funnel and is connected at the nitrogen in flow. The reaction mixture is heated to 60° C. The heating mantel is turned off and removed. The $H_2O_2$ is then added drop wise keeping the temperature around 60° C. with an ice bath as necessary. After the addition is complete, the reaction is brought to about 80° C. and refluxed for about 6 h. The heating mantel is then removed and the reaction mixture is allowed to cool to around 60° C. The aqueous phase was removed using a separatory funnel. The remaining volatiles are then removed under reduced pressure. The final product is used without further purification.

Inventive Example 4

2-Mercapto-5-methyl-1,3,4-thiadiazole (purchased from Sigma-Aldrich Co. LLC.; 1 mol), t-dodecyl thiol (1 mol), EtOH (300 g), and H₂O (300 g) are charged into a 3-neck 1-L round bottom flask. The flask is then equipped with overhead stirring, a claisen adapter with a thermocouple and a condenser, and an adapter with nitrogen in flow. An outlet adapter is connected to the condenser and flows to a 15-20% NaOH scrubber and a bleach scrubber. The H₂O₂ (35 wt %, 97.2 g) is then weighed into an addition funnel and is connected at the nitrogen in flow. The reaction mixture is heated to 50° C. The heating mantel is turned off and removed. The H₂O₂ is then added drop wise (over about 1 h) keeping the temperature around 60° C. with an ice bath as necessary. After the addition is complete, the reaction is brought to about 80° C. and refluxed for about 7 h. The heating mantel is then removed and the reaction mixture is allowed to cool. The aqueous phase is then decanted off as much as possible. A separatory funnel may be used to remove additional water. The remaining volatiles are then removed under reduced pressure. The final product is used without further purification.

Comparative Example 1

A commercially available copper corrosion inhibitor and extreme pressure agent DMTD mixture, was used as DMTD 1. DMTD-1 is a mixture of a compound wherein the 1,3,4-thiadiazole ring is bonded at both the 2- and 5-positions with —S—S—C9 alkyl groups and a compound wherein the 1,3,4-thiadiazole ring is bonded at the 2-position with an —S—S—C9 alkyl group and is bonded at the 5-position with an —SH group.

Comparative Example 2

A commercially available copper corrosion inhibitor and extreme pressure agent different from the DMTD-1 used in Comparative Example 1 was used as DMTD 2. DMTD-2 is primarily a compound which is substituted at the 2-position of the 1,3,4-thiadiazole ring with the —S—S—C12 alkyl group and is substituted at the 5-position with an —SH group.

Comparative Example 3

A third type of commercially available copper corrosion inhibitor and extreme pressure agent was used as DMTD-3. DMTD-3 is primarily a compound wherein the 1,3,4-thiadiazole ring is bonded at both the 2- and 5-positions with —S—S—C8 alkyl groups.

Transmission Fluid Composition Examples:

Transmission fluid composition Examples ("TFE") were prepared with the thiadiazole compounds of Inventive Examples 1-4 and the DMTD compounds of Comparative Examples 1-3, and were subjected to various testing regimes to assess their performance as anti-wear agents and to determine their influence on color stability. The tests included FZG scuffing, 4-ball wear scar testing, and Colorquest testing. The testing methodologies and parameters used are set forth below. Each described test was performed with transmission fluid compositions having essentially the same formulation except that the thiadiazole was changed as described below.

For each TFE, the base lubricant was identical and included all of the components as shown in Table 2, where one of the extreme pressure/antiwear agents was the thiadiazole as outlined in Tables 3 and 4, a succinimide dispersant at 4-8 wt. %, and a succinimide friction modifier at 0.4-0.6 wt. %, and the balance being an UltraS base oil (a Group III mineral oil). The final formulation had a KV(100) of 4.0-8.0.

Color Stability:

In order to test for color stability, essentially identical transmission fluid compositions as described above, that included a thiadiazole as an Extreme pressure/Antiwear agent were prepared. The transmission fluid compositions differed in the type and treat rate of thiadiazole compound, where the base oil treat rate was also varied to compensate the thiadiazole treat rate change. A first set of TFE's contained a conventional thiadiazole component (Comparative Example 1) having a dimercapto thiadiazole (DMTD) core at different treat rates. These were labeled Comparative TFE1 to Comparative TFE9. A second set of transmission fluid compositions included Inventive Example 1 which is a thiadiazole compound of inventive Formula (I) wherein the 2-position of the 1,3,4-thiadiazole ring in the Inventive Compound 1 is substituted with a group containing the same group as found in DMTD 1 of Comparative Example 1 and the 5-position of Inventive Compound 1 is substituted with a methyl group. These were labeled Inventive TFE1 to Inventive TFE9.

The TFE's were thermally aged at 150° C. for 72 hours (about 35 g in 25×150 mm glass vials from VWR International, LLC.). Each of the samples was diluted (10% sample, 90% UltraS4 base oil). Using a spectrophotometer (ColorQuest®XE Spectrophotometer from HunterLab using Easy Match QC software), the values of L* were obtained from the diluted samples and in general following the procedure outlined by the manufacturer. The instrument is allowed to warm up for at least two hours. The instrument is then configured to CIE LAB scale, D65/10 illuminant observer with nominal UV filtration and the Colorquest XE sensor is added. The diluent, UltraS4, is used to zero the instrument. The instrument is standardized ($1^{st}$ with black card on inside, $2^{nd}$ with white tile on outside, as prompted by instrument). The sample is then placed against the sensor sphere, the compartment is closed and the sample is tested. The samples were measured in acrylic cuvettes (from Joe Pietryka, Inc.) (30 mm×50 mm×10 mm) L* of 100 indicates the brightest white and L* of 0 indicates the darkest black. The ΔL* was then calculated as an indicator of degree of darkening where a more negative ΔL* indicates a darker fluid based on the following equation:

$$\Delta L^* = L^*_{aged\,fluid} - L^*_{fresh\,fluid}$$

The various concentrations of thiadiazole in the transmission fluid compositions is shown in Table 3 below. In Inventive TFE1 to Inventive TFE9, the thiadiazole compound of Inventive Example 1 was blended at equal sulfur concentration with the comparably numbered Comparative TFE1 to Comparative TFE9 containing the DMTD compound of Comparative Example 1. For instance, the concentration of the thiadiazole compound of Inventive TFE1 provided the same sulfur concentration to the transmission fluid composition as the concentration of Comparative Example 1 in Comparative TFE1.

TABLE 3

| Example (diluted as described above) | Thiadiazole | Treat rate (wt %) | ΔL* 150° C./72 hr |
|---|---|---|---|
| Comp. TFE 1 | Comparitive | 0.05 | −5.70 |
| Comp. TFE 2 | Example 1 | 0.10 | −9.10 |
| Comp. TFE 3 | ((DMTD type) | 0.15 | −12.19 |
| Comp. TFE 4 | | 0.20 | −15.43 |
| Comp. TFE 5 | | 0.25 | −18.68 |

TABLE 3-continued

| Example (diluted as described above) | Thiadiazole | Treat rate (wt %) | ΔL* 150° C./72 hr |
|---|---|---|---|
| Comp. TFE 6 | | 0.30 | −23.64 |
| Comp. TFE 7 | | 0.40 | −29.35 |
| Comp. TFE 8 | | 0.50 | −34.31 |
| Comp. TFE 9 | | 0.60 | −37.43 |
| Inv. TFE 1 | Inventive | 0.055 | −3.95 |
| Inv. TFE 2 | Example 1 | 0.110 | −4.69 |
| Inv. TFE 3 | (thiadiazole | 0.165 | −4.68 |
| Inv. TFE 4 | type) | 0.220 | −5.08 |
| Inv. TFE 5 | | 0.275 | −5.92 |
| Inv. TFE 6 | | 0.33 | −8.69 |
| Inv. TFE 7 | | 0.44 | −8.08 |
| Inv. TFE 8 | | 0.55 | −8.29 |
| Inv. TFE 9 | | 0.66 | −9.60 |

As shown in Table 3 above, the inventive thiadiazole compound has surprisingly high color stability when compared to the conventional DMTD compound. Also, it was found that color darkening was linearly dependent on concentration for both thiadiazoles at the treat rates studied.

Color Stability and Extreme Pressure AntiWear Property

Samples were tested to show that the inventive thiadiazole compound of Formula (I) has color stability which is unexpectedly better than conventional DMTD type thiadiazoles while still retaining similar extreme pressure and antiwear properties. Each of the samples was prepared with UltraS base oils. The data is shown in Table 4 below.

TABLE 4

| | Comparative TFE A | Comparative TFE B | Comparative TFE C | Comparative TFE D | Inventive TFE A | Inventive TFE B | Inventive TFE C | Inventive TFE D |
|---|---|---|---|---|---|---|---|---|
| Thiadiazole S (%) equiv | 1 | 1 | 1 | 1 | 1 | 1 | 1 | 1 |
| Thiadiazole Example (type) | Comparative Example 1 (DMTD 1) | Comparative Example 2 (DMTD 2) | Comparative Example 3 (DMTD 3) | NA | Inventive Example 1 | Inventive Example 2 | Inventive Example 3 | Inventive Example 4 |
| Thiadiazole Treat rate (wt. %) | 0.20 | 0.2 | 0.21 | 0.00 | 0.22 | 0.2 | 0.26 | 0.26 |
| Thiadiazole S (wt. %) | 35 | 35 | 33 | 0 | 32 | 35 | 27 | 27 |
| Finished fluid S (wt. %) from thiadiazole | 0.07 | 0.07 | 0.07 | 0.00 | 0.07 | 0.07 | 0.07 | 0.07 |
| Finished fluid S (wt. %) (measured, total) | 0.13 | 0.14 | 0.14 | BDL | 0.13 | 0.13 | 0.14 | 0.13 |
| FZG (A/8.3/150), pass stg | 9 | 12 | 12 | 7 | 10 | 12 | 12 | 10 |
| Mercon V 4-Ball wear 40 kg/100° C., Avg | 0.39 | 0.48 | 0.42 | 0.75 | 0.39 | 0.51 | 0.50 | 0.41 |
| Color (ΔL*)_150° C | −15.79 | −18.71 | −14.64 | −2.96 | −5.39 | −6.76 | −6.59 | −5.5 |

The extreme pressure antiwear measurements in the Table 4 include the FZG test and the 4-ball wear test and were performed on similar transmission fluid compositions that varied in the type of thiadiazole used. The concentration and type of thiadiazole compound used is shown in Table 4. The FZG test was performed with a gear having width "A", a velocity of 8.3 m/s, and at 150° C. This FZG test is a variant of CEC L-07-A95 (2014) and D5182-97(2014), because it was performed at an elevated temperature of 150° C. instead of 90° C. The 4-Ball wear test D-4172-94 (2010) was modified so as to be run under the conditions of 600 rpm/40 kg/100° C./2 h.

As shown in Table 4, the DMTD mixtures of Comparative TFE's A-C had a very low color stability with the ΔL* ranging from −18.71 to −14.64. On the other hand the thiadiazole compounds of Formula (I) in Inventive TFE's A-C had excellent color stability as shown in the ΔL* values ranging from −6.76 to −5.5.

Also, the thiadiazole compounds of Inventive TFE's A-C were found to have similar extreme pressure antiwear properties when compared to Comparative TFE's A-C as shown by the data obtained with the FZG test and the 4-ball wear test.

Comparative TFE D was prepared as a reference example which is similar to the other examples except that Comparative TFE D had no thiadiazole in the transmission fluid composition. It was found that Comparative TFE D had good color stability, but it had unacceptably low extreme pressure antiwear characteristics.

In conclusion, the object of the invention was achieved, because the thiadiazole compounds of Formula (I) give the transmission fluid compositions excellent color stability while also retaining the extreme pressure antiwear properties.

Other embodiments of the present disclosure will be apparent to those skilled in the art from consideration of the specification and practice of the invention disclosed herein. As used throughout the specification and claims, "a" and/or "an" may refer to one or more than one. Unless otherwise indicated, all numbers expressing quantities of ingredients, properties such as molecular weight, percent, weight percent, ratio, reaction conditions, and so forth used in the specification are to be understood as being modified in all instances by the term "about." Accordingly, unless indicated to the contrary, the numerical parameters set forth in the specification are approximations that may vary depending upon the desired properties sought to be obtained by the present invention. At the very least, and not as an attempt to limit the application by the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope of the invention being indicated by the following claims.

I claim:

1. A transmission fluid composition comprising
about 50% to about 99% by weight of a base oil, based on the total weight of the transmission fluid composition and an additive composition comprising one of:
(a) a reaction product of thiadiazole of one of the formulae (III) and (IV):

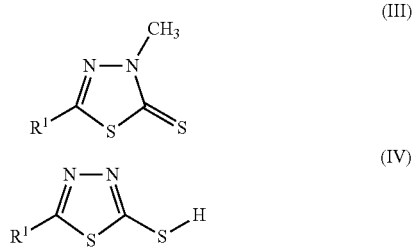

wherein $R^1$ is a substituted or unsubstituted hydrocarbyl group having 1-100 carbon atoms; and a thiol of the formula $R^3$—SH, wherein $R^3$ is a substituted or unsubstituted hydrocarbyl group having 1-100 carbon atoms, and optionally an additional sulfur source; and
(a) at least one compound of the Formulas (I)-(II):

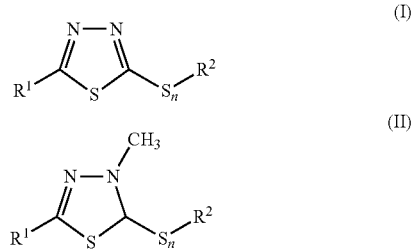

wherein n is 1-5; $R^1$ is a substituted or unsubstituted hydrocarbyl group having 1-100 carbon atoms; and $R^2$ is hydrogen or a substituted or unsubstituted hydrocarbyl group having 1-100 carbon atoms; and the transmission fluid composition is adapted for use in a transmission.

2. The transmission fluid composition as claimed in claim 1 wherein the additive composition comprises at least one compound of the Formula (I).

3. The transmission fluid composition as claimed in claim 1 wherein the additive composition comprises at least one compound of the Formula (II).

4. The transmission fluid composition as claimed in claim 1, wherein the additive composition comprises at least one compound of the Formula (I) and at least one compound of the Formula (II).

5. The transmission fluid composition of claim 1, wherein $R^1$ is an alkyl group having 1-10 carbon atoms and n is 2.

6. The transmission fluid composition of claim 5, wherein n is 2 and $R^2$ is a hydrocarbyl group having 5-15 carbon atoms.

7. The transmission fluid composition of claim 6, wherein n is 2 and $R^2$ is a hydrocarbyl group having 8-12 carbon atoms.

8. The transmission fluid composition of claim 7, wherein n is 2 and $R^2$ is a hydrocarbyl group having 8-12 carbon atoms and $R^1$ is a methyl group.

9. The transmission fluid composition of claim 1, having a change in color absorption $\Delta L^*$ of negative 12 to 0, wherein $\Delta L^*$ is measured with a spectrophotometer at 150° C. for 72 hours, at a content of at least 0.15 wt. % of the at least one thiadiazole compound; and wherein $\Delta L^*$ is measured by the formula $\Delta L^* = L^*_{aged\ fluid} - L^*_{fresh\ fluid}$.

10. The transmission fluid composition of claim 1, having a change in color absorption $\Delta L^*$ of negative 11 to negative 0.5, wherein $\Delta L^*$ is measured with a spectrophotometer at 150° C. for 72 hours, at a content of at least 0.15 wt. % of the at least one thiadiazole compound; and wherein $\Delta L^*$ is measured by the formula $\Delta L^* = L^*_{aged\ fluid} - L^*_{fresh\ fluid}$.

11. The transmission fluid composition of claim 1, having a change in color absorption $\Delta L^*$ of negative 10 to negative 1, wherein $\Delta L^*$ is measured with a spectrophotometer at 150° C. for 72 hours, at a content of at least 0.15 wt. % of the at least one thiadiazole compound; and wherein $\Delta L^*$ is measured by the formula $\Delta L^* = L^*_{aged\ fluid} - L^*_{fresh\ fluid}$.

12. The transmission fluid composition of claim 1, wherein the base oil comprises from about 70 wt. % to about 95 wt % of the total weight of the transmission fluid composition.

13. The transmission fluid composition of claim 1, wherein the sulfur content delivered to the transmission fluid composition by the at least one thiadiazole compound of the Formulas (I)-(II) is from about 50 to about 10,000 ppm.

14. The transmission fluid composition of claim 1, wherein the sulfur content delivered to the transmission fluid composition by the at least one thiadiazole compound of the Formulas (I)-(II) is from about 300 to about 2,500 ppm.

15. The transmission fluid composition of claim 1, wherein the sulfur content delivered to the transmission fluid composition by the at least one thiadiazole compound of the Formulas (I)-(II) is from about 400 to about 2,000 ppm.

16. The transmission fluid composition of claim 1, wherein the total sulfur content of the transmission fluid composition is from about 50 to about 12,000 ppm.

17. An automatic transmission containing the transmission fluid composition of claim 1.

18. The automatic transmission of claim 17, wherein the automatic transmission is selected from the group consisting of a continuously variable transmission, step type transmission or double clutch transmission.

19. A method of operating a transmission comprising a step of operating the transmission lubricated with the transmission fluid composition of claim 1.

20. A vehicle comprising an engine and a transmission, the transmission including the transmission fluid composition of claim 1.

21. An additive composition for a transmission fluid, the additive composition comprising at least one color stable extreme pressure performance improver selected from one of
(a) a reaction product of thiadiazole of one of the formulae (III) and (IV):

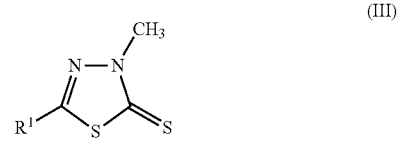

-continued

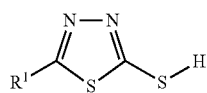
(IV)

wherein R¹ is a substituted or unsubstituted hydrocarbyl group having 1-100 carbon atoms; and a thiol of the formula R³—SH, wherein R³ is a substituted or unsubstituted hydrocarbyl group having 1-100 carbon atoms, and optionally an additional sulfur source; and (b) compounds of the Formulas (I)-(II):

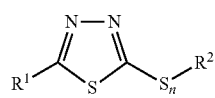
(I)

-continued

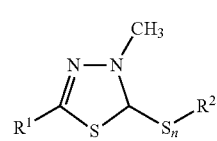
(II)

wherein n is 1-5; R¹ is a substituted or unsubstituted hydrocarbyl group having 1-100 carbon atoms; and R² is a hydrogen or is a substituted or unsubstituted hydrocarbyl group having 1-100 carbon atoms.

22. The additive composition for a transmission fluid of claim 21, wherein the additive improves extreme pressure characteristics while maintaining color stability of a transmission fluid.

* * * * *